(12) United States Patent
Lee et al.

(10) Patent No.: US 10,187,798 B2
(45) Date of Patent: *Jan. 22, 2019

(54) TERMINAL DEVICE HAVING SUBSCRIBER IDENTITY DEVICE AND METHOD FOR SELECTING PROFILE THEREOF

(71) Applicant: KT Corporation, Seongnam-si (KR)

(72) Inventors: Hyung Jin Lee, Seoul (KR); Kwan Lae Kim, Seoul (KR); Chul Hyun Park, Seoul (KR); Myoung Hee Seo, Seoul (KR); Jin Hyoung Lee, Seoul (KR); Youn Pil Jeung, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,959

(22) Filed: Aug. 30, 2017

(65) Prior Publication Data

US 2017/0366972 A1 Dec. 21, 2017

Related U.S. Application Data

(63) Continuation of application No. 14/440,131, filed as application No. PCT/KR2013/009954 on Nov. 5, 2013.

(30) Foreign Application Priority Data

Nov. 6, 2012 (KR) .................. 10-2012-0124606
Nov. 5, 2013 (KR) .................. 10-2013-0133421

(51) Int. Cl.
*H04W 12/06* (2009.01)
*H04W 8/26* (2009.01)
(Continued)

(52) U.S. Cl.
CPC ............ *H04W 12/06* (2013.01); *H04W 8/18* (2013.01); *H04W 8/26* (2013.01); *H04L 63/08* (2013.01);
(Continued)

(58) Field of Classification Search
CPC ....... H04W 4/003; H04W 8/18; H04W 8/183; H04W 8/26; H04W 8/265; H04W 12/06;
(Continued)

(56) References Cited

U.S. PATENT DOCUMENTS

2007/0230453 A1* 10/2007 Giaretta .................. H04L 63/08
370/389
2011/0252240 A1 10/2011 Freedman et al.
(Continued)

FOREIGN PATENT DOCUMENTS

KR 10-2012-0044916 A 5/2012
WO 2009/042840 A1 4/2009

OTHER PUBLICATIONS

International Search Report for PCT/KR2013/009954 dated Feb. 7, 2014.

*Primary Examiner* — Jayesh M Jhaveri
(74) *Attorney, Agent, or Firm* — Sughrue Mion, PLLC (57) ABSTRACT

A terminal device having a subscriber identity device and a method for selecting a profile thereof, are disclosed. A mobile communication terminal device comprises: a subscriber identity module including a profile, a network authenticator which performs an authentication procedure for a communication network on the basis of a provisioning profile among profiles, and which receives authentication completion information from an operator server of the communication network; and a network access unit which accesses the communication network on the basis of the authentication completion information, and which receives a service from the operator server on the basis of an operational profile corresponding to an operator of the communication network among the profiles.

12 Claims, 7 Drawing Sheets

(51) Int. Cl.
*H04W 8/18* (2009.01)
*H04L 29/06* (2006.01)

(52) U.S. Cl.
CPC .......... *H04L 63/102* (2013.01); *H04W 8/183* (2013.01); *H04W 8/265* (2013.01)

(58) Field of Classification Search
CPC ....... H04L 63/08; H04L 63/102; H04L 29/06; G06F 7/04; G06F 15/16; G06F 17/30
See application file for complete search history.

(56) References Cited

U.S. PATENT DOCUMENTS

| | | |
|---|---|---|
| 2011/0306318 A1 | 12/2011 | Rodgers |
| 2011/0320579 A1* | 12/2011 | Takeuchi .............. H04W 4/001 709/223 |
| 2012/0108207 A1 | 5/2012 | Schell et al. |
| 2012/0108295 A1 | 5/2012 | Schell et al. |
| 2012/0135710 A1 | 5/2012 | Schell et al. |
| 2012/0172016 A1* | 7/2012 | Veneroso .............. H04W 8/205 455/414.1 |
| 2012/0231844 A1 | 9/2012 | Coppinger |
| 2013/0095794 A1 | 4/2013 | Lhamon |
| 2014/0004827 A1* | 1/2014 | O'Leary .................. H04W 8/22 455/411 |
| 2014/0094139 A1* | 4/2014 | Xu ....................... H04L 41/0893 455/406 |
| 2014/0140507 A1 | 5/2014 | Park |
| 2014/0220952 A1 | 8/2014 | Holtmanns |
| 2014/0308991 A1* | 10/2014 | Lee ........................ H04W 8/183 455/558 |
| 2015/0319133 A1* | 11/2015 | Seo ..................... H04L 61/1588 709/223 |
| 2017/0318465 A1* | 11/2017 | Seo .......................... H04W 8/20 |
| 2017/0366972 A1* | 12/2017 | Lee ....................... H04W 12/06 |
| 2018/0013759 A1* | 1/2018 | Seo ....................... H04L 63/123 |

* cited by examiner

| LENGTH (HEXADECIMAL DIGIT) | CONTENTS | | |
|---|---|---|---|
| 1 | APPLICATION TEMPLATE TLV OBJECT | | APPLICATION TEMPLATE TAG |
| 1 | | | LENGTH OF THE APPLICATION TEMPLATE |
| 1 | | APPLICATION IDENTIFIER TLV OBJECT | APPLICATION IDENTIFIER TAG |
| 1 | | | APPLICATION IDENTIFIER LENGTH |
| '01'~'10' | | | APPLICATION IDENTIFIER VALUE |
| 1 | | APPLICATION LABEL TLV OBJECT | APPLICATION LABEL TAG |
| 1 | | | APPLICATION LABEL LENGTH |
| UP TO '20' | | | APPLICATION LABEL VALUE |
| 1 | | APPLICATION STATE TLV OBJECT | APPLICATION STATE TAG |
| 1 | | | APPLICATION STATE LENGTH |
| 1 | | | APPLICATION STATE VALUE |

TERMINAL DEVICE HAVING SUBSCRIBER IDENTITY DEVICE AND METHOD FOR SELECTING PROFILE THEREOF

CROSS-REFERENCE TO RELATED APPLICATIONS

This application is a continuation of U.S. patent application Ser. No. 14/440,131 filed on May 1, 2015, which is a National Stage Application of International Patent Application No. PCT/KR2013/009954, filed on Nov. 5, 2013, which claims the benefit of Korean Patent Application Nos. 10-2012-0124606, filed on Nov. 6, 2012, and Korean Patent Application No. 10-2013-0133421, filed on Nov. 5, 2013, the disclosures of which are incorporated herein in their entirety by reference.

BACKGROUND

1. Technical Field

Methods and apparatuses consistent with exemplary embodiments relate to a method of selecting a profile stored in an embedded universal integrated circuit (IC) card, a terminal device having a subscriber identity device, and more particularly, to a configuration of attribute information of the profile and a procedure of a terminal device selecting a specific profile using the attribute information.

2. Description of Related Art

A universal integrated circuit card (UICC) is a smart card that may be inserted into a terminal and used as a module for authenticating a user with a mobile communication network to which the user has subscribed. A UICC may store network information (e.g., international mobile subscriber identity, home public land mobile network, etc.) regarding a mobile network operator (MNO) (hereinafter also referred to as an operator), user information (e.g., short message service), and a phonebook. A UICC for Global System for Mobile communications (GSM) may be called a subscriber identity module (SIM) card, and a UICC for Wideband Code Division Multiple Access (WCDMA) or Long Term Evolution (LTE) may be called a universal subscriber identity module (USIM).

Network Access Applications (NAAs), which are applications used to access several networks of several operators, may be included in a UICC.

When a user installs a UICC in the user's terminal, user authentication is automatically performed with a mobile communication network to which the user has been subscribed, and thus the user may conveniently receive a mobile communication service through the terminal. In addition, the user may easily replace his/her terminal by removing a UICC from an old terminal and installing the UICC in a new terminal. When a user intends to change MNOs, the user may simply perform the change by replacing a UICC removed from an existing terminal with that of a desired MNO.

Furthermore, the user may simply change MNOs by replacing the UICC with that of the desired MNO and then use his/her terminal. That is, in an existing UICC environment, a SIM profile properly prepared for requirements of the MNO is embedded in a separate card and distributed independently of the terminal. In order to subscribe to a service of a specific MNO, a user purchases a terminal and a UICC, inserts the UICC into the terminal, activates the terminal according to an activation procedure predetermined by the MNO, and then uses the terminal.

An embedded UICC (hereinafter referred to as eUICC) structure has been proposed to provide the same service as the removable UICC when it is difficult for the user to remove the UICC from the terminal. Such can occur in a terminal that requires minimization. For example, in a machine to machine (M2M) terminal having a structure in which a UICC is installed it may be difficult to replace the UICC, or it may be difficult to replace the UICC when the UICC is provided as a chip in a terminal integration structure rather than in a removable structure since the UICC requires high heat and shock tolerances, compared to an existing UICC having a removable plastic structure.

The eUICC provides a network access authentication function similar to the existing removable UICC. However, network accesses of several operators should be able to be processed using one eUICC because of a difference in physical structure. Furthermore, there are many issues such as eUICC activation/distribution/subscriber information security and thus solutions for the issues need to be provided. In order to solve this, international standardization organizations such as Groupe Speciale Mobile Association (GSMA) and European Telecommunications Standards Institute (ETSI) have developed standardization activities on a necessary element including a top structure together with related companies such as a network operator, a manufacturer, a SIM vendor, etc.

In ETSI, a working group (WG) for establishing an eUICC standard is active, and requirements are currently being established to define a module that is called a 'profile' to personalize an application for a network access authentication function of several operators, such that the profile may be remotely installed to the eUICC and managed. In addition, a management policy and an application solution of the profile are being discussed, but detailed solutions are not defined yet.

Since details related to profile management of the eUICC are not defined, an eUICC card manufacturer, a terminal manufacturer, and an eco-system operator have many difficulties in developing and commercializing the eUICC. Furthermore, until now, when one or more profiles are installed in the eUICC, a procedure for selecting a specific profile or attribute information regarding profiles needed for the selection is not defined in detail, thus there are difficulties in implementing relevant functions.

Even in a global standard, only the profiles are merely defined, and detailed methods about how the eUICC can provide information to be used to select a specific profile are not discussed; for example, the global standard may only define a profile type (e.g., a provisioning profile and an operational profile), a profile provider (or operator), and a profile state (activation or deactivation) and how the terminal can acquire corresponding information, that is, information for selecting a specific profile to select the specific profile. Accordingly, a method of defining and implementing how profile attribute information such as a profile type (e.g., provisioning profile and an operational profile), a profile provider (or operator), and a profile state (activation or deactivation) that are stored in the eUICC is configured and how the mobile communication terminal can select a specific profile using the profile attribute information is required.

SUMMARY

Exemplary embodiments are directed to a configuration of attribute information regarding profiles stored in an eUICC and a procedure of a terminal when the eUICC selects a specific profile.

Exemplary embodiments are also directed to storing, in a terminal device, profiles for authenticating and accessing mobile communication networks provided by many mobile network operators and selecting a profile from among the stored profiles, if necessary, to perform authentication and access to receive services provided by the mobile communication network operators.

Exemplary embodiments are also directed to a subscriber identity device and a terminal device having the subscriber identity device embedded therein.

One aspect of the exemplary embodiments provides a mobile communication terminal device including a subscriber identity module having at least one or more profiles, a network authenticator configured to perform an authentication procedure for a communication network based on a provisioning profile among the at least one or more profiles and receive authentication completion information from an operator server of the communication network, and a network communicator configured to access the communication network based on the authentication completion information and receive a service from the operator server based on an operational profile corresponding to an operator of the communication network among the at least one or more profiles.

The mobile communication terminal device may further include a profile selector configured to select the provisioning profile and the operational profile based on an elementary file including attribute information related to the at least one or more profiles.

The attribute information may include an application identifier for identifying the at least one or more profiles.

The application identifier may comprise a registered application provider identifier (RID) and a proprietary application identifier extension (PIX), and the proprietary application identifier extension (PIX) may include at least one from among an application code, a country code, an application provider code, and an application provider field option.

The application code may include classification information for classifying types of the at least one or more profiles.

The types of the at least one or more profiles may include a provisioning profile type, an operational profile type, and an operational profile type containing data of the provisioning profile.

Another aspect of the exemplary embodiments provides a subscriber identity device embedded in a mobile communication terminal device that accesses a communication network using at least one or more profiles, the subscriber identity device including a first storage configured to store at least one provisioning profile having authentication information related to the communication network; a second storage configured to store at least one operational profile having service access information used to receive a service of the communication network, and an elementary file storage configured to store an elementary file having attribute information related to the at least one profile used to select at least one profile.

The subscriber identity device may further include a third storage configured to store at least one user profile having user information of the mobile communication terminal device.

The at least one provisioning profile and the at least one operational profile may be selected based on the elementary file including attribute information related to the at least one or more profiles.

The attribute information may include application identifier information, application label information, and application state information for any profile among the at least one or more profiles.

The application identifier information may include an application identifier (AID) for identifying any profile, and the application identifier may comprise a registered application provider identifier (RID) and a proprietary application identifier extension (PIX).

The proprietary application identifier extension may include at least one from among an application code, a county code, an application provider code, and an application provider field option.

The application code may comprise classification information for classifying types of the at least one or more profiles.

The types of the at least one or more profiles may include a provisioning profile type, an operational profile type, and an operational profile type containing data of a provisioning profile.

Still another aspect of exemplary embodiments provides a method of accessing a communication network using at least one or more profiles included in a subscriber identity module, the method including performing an authentication procedure for the communication network based on a provisioning profile among the at least one or more profiles and receiving authentication completion information from an operator server of the communication network; and accessing the communication network based on the authentication completion information and receiving a service from the operator server based on an operational profile corresponding to an operator of the communication network among the at least one or more profiles.

The method may further include, before the receiving of the authentication completion information, selecting the provisioning profile and the operational profile based on an elementary file including attribute information related to the at least one or more profiles.

The attribute information may comprise an application identifier for identifying the at least one or more profiles.

The application identifier may comprise a registered application provider identifier (RID) and a proprietary application identifier extension (PIX), and the proprietary application identifier extension (PIX) may comprise at least one from among an application code, a country code, an application provider code, and an application provider field option.

The application code may comprise classification information for classifying types of the at least one or more profiles.

The types of the at least one or more profiles may include a provisioning profile type, an operational profile type, and an operational profile type containing data of a provisioning profile.

With the terminal device having the subscriber identity device embedded therein and the method of selecting a profile according to an exemplary embodiment, the terminal device can acquire attribute information related to profiles stored in an eUICC, select a specific profile using the attribute information, and access a mobile communication network using the selected profile to receive a relevant service.

Through the device and method, advantageously, a user of the terminal device can simply change his/her operator network to access networks of several mobile network operators and receive a variety of related services.

DETAILED DESCRIPTION

While the exemplary embodiments are susceptible to various modifications and alternative forms, specific embodiments thereof are shown by way of example in the drawings and will herein be described in detail. However, it should be understood that the present invention is not limited to these exemplary embodiments, and may include any and all modification, variations, equivalents, substitutions and the like within the spirit and scope thereof. Like reference numerals refer to like elements throughout.

Relational terms such as first, second, and the like may be used for describing various elements, but the elements should not be limited by the terms. These terms are only used to distinguish one element from another. For example, a first component may be called a second component, and a second component may also be called a first component without departing from the scope of the present invention. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

The terms used in the present specification are set forth to explain the exemplary embodiments, and the scope of the present invention is not limited thereto. The singular number includes the plural number as long as they are not apparently different from each other in meaning. In the present specification, it will be understood that the terms "have," "comprise," "include," and the like are used to specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. Terms such as terms that are generally used and have been in dictionaries should be construed as having meanings matched with contextual meanings in the art. In this description, unless defined clearly, terms are not ideally, excessively construed as formal meanings.

First, terms used herein may be described as follows. Also, the terms described below are defined with consideration of the functions in the present invention, and thus may vary depending on intentions of a client, an operator, or a user, or precedents. Accordingly, the definition would be made on the basis of the whole specification.

The term 'operator' used herein denotes a mobile network operator (MNO).

A subscriber identity module or subscriber identity device is an embedded UICC (eUICC) or embedded SIM (eSIM), and means an eSIM that is integrally installed upon manufacturing of the terminal, unlike an existing removable UICC.

The term 'embedded UICC (eUICC)' or 'embedded SIM' means an embedded SIM integrally installed when the terminal is manufactured, unlike an existing removable UICC.

A SIM denotes a subscriber identification module, and a SIM profile means a specific group (set) of information parameter values included in the SIM. The term 'profile' used herein denotes such a SIM profile. Files that may be stored in an embedded UICC, that is, a master file (MF), a dedicated file (DF), an application dedicated file (ADF), an elementary file (EF), and a credential are collectively defined as the profile.

The term 'terminal' used herein is referred to as a mobile station (MS), a user equipment (UE), a user terminal (UT), a wireless terminal, an access terminal (AT), a subscriber unit (SU), a subscriber station (SS), a wireless device, a wireless communication device, a wireless transmit/receive unit (WTRU), a mobile node, a mobile device, or the like. Various embodiments of the terminal may include a cellular phone, a smart phone with a wireless communication function, a personal digital assistant (PDA) with a wireless communication function, a wireless modem, a portable computer with a wireless communication function, an imaging apparatus such as a digital camera with a wireless communication function, a gaming apparatus with a wireless communication function, a home appliance for storing and playing music files with a wireless communication function, an Internet home appliance capable of wireless Internet connection and browsing as well as portable units or terminals incorporating combinations of the functions.

In addition, the terminal may include, but is not limited to, a machine-to-machine (M2M) terminal and a machine type communication (MTC) terminal/device.

In addition, each block or step described herein may indicate a portion of a module, segment, or code including one or more executable instructions for executing a specific logical function(s). In addition, in some exemplary embodiments, it should be recognized that the functions described in the blocks or steps can be performed in a different order.

For example, two successively illustrated blocks or steps may be actually performed at the same time or may be performed in reverse order depending on the corresponding function.

Exemplary embodiments will be described below in more detail with reference to the accompanying drawings. In describing the exemplary embodiments, in order to facilitate the entire understanding of the exemplary embodiments, like numbers refer to like elements throughout the description of the figures and the repetitive description thereof will be omitted.

Figure 1:
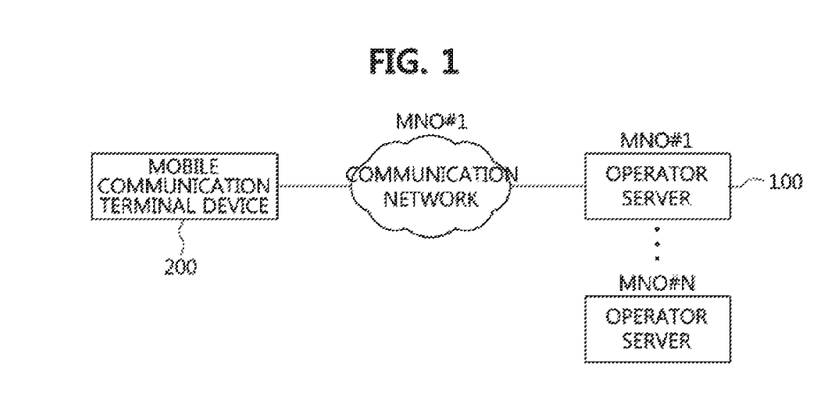
FIG. 1 is a conceptual view illustrating an environment of a mobile communication terminal device and a mobile network operator server according to an exemplary embodiment.

FIG. 1 is a conceptual view illustrating an environment of a mobile communication terminal device 200 and a mobile network operator server 100 according to an exemplary embodiment.

Referring to FIG. 1, a wireless communication network including a mobile communication network that is referred to as 3rd Generation (3G), Long Term Evolution (LTE), Long Term Evolution Advanced (LTE-A), or the like is operated by mobile network operators. Each operator may own a wireless communication network that may provide its own service, and users may access the wireless communication network of each operator through the mobile communication terminal device 200 to receive a service.

Users may access the wireless communication network of the operator, from which the users desire to receive a service, through the terminal device 200 that is provided by the operator or by inserting a UICC provided by the operator into the terminal device 200. As the method of accessing the wireless communication network through the UICC provided by the operator, a method of using an eUICC embedded in the terminal device 200 is allowed as described above.

Figure 2:
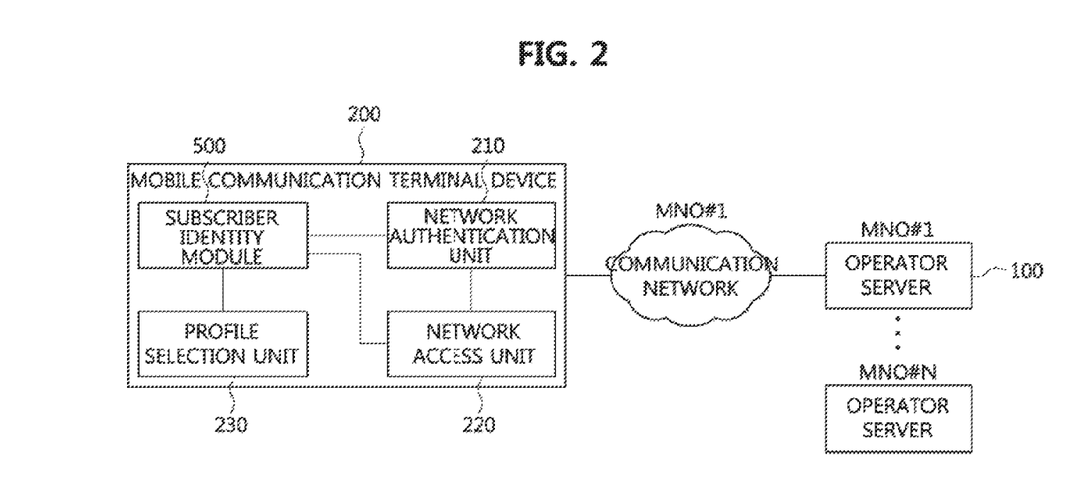
FIG. 2 is a conceptual view illustrating a mobile communication terminal device and its elements according to an exemplary embodiment.
Figure 3:
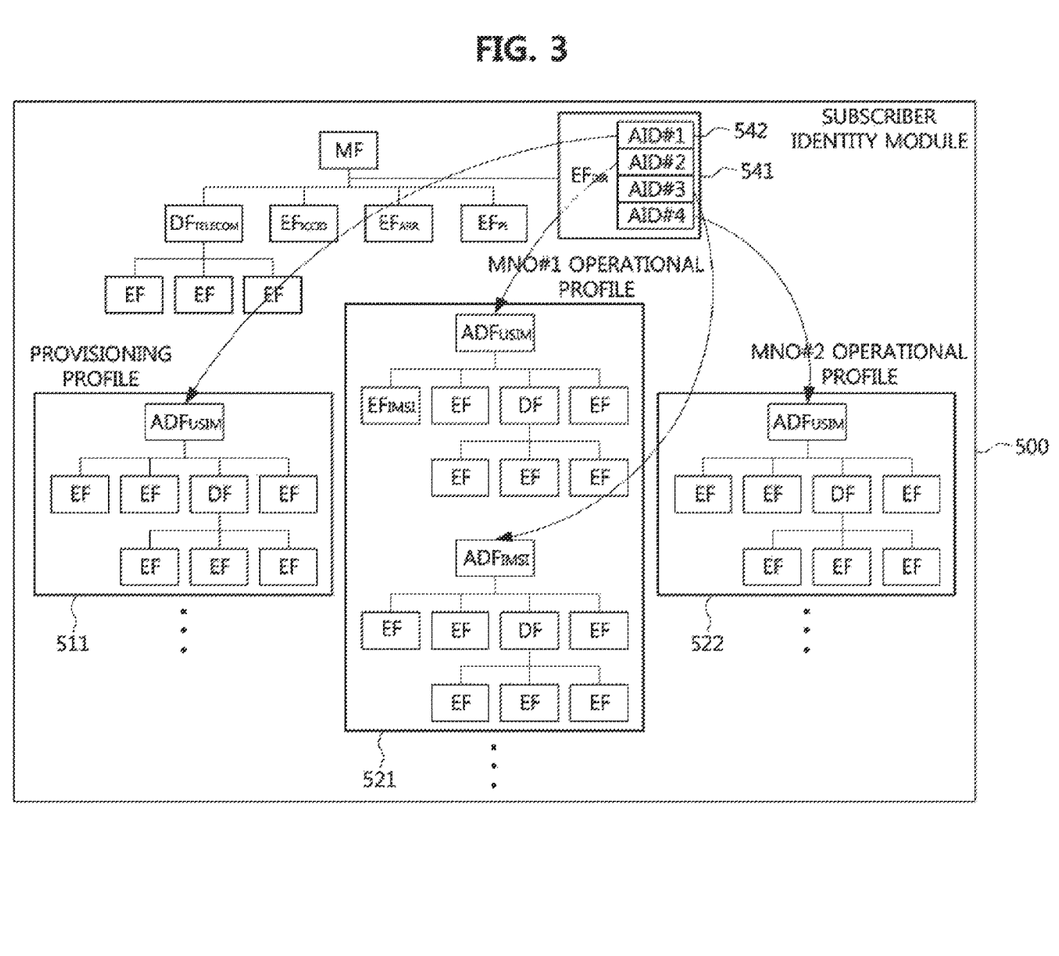
FIG. 3 is a block diagram illustrating a subscriber identity module embedded in a mobile communication terminal device and information stored therein according to another exemplary embodiment.

FIG. 2 is a conceptual view illustrating a mobile communication terminal device 200 and its elements according to an exemplary embodiment, and FIG. 3 is a block diagram illustrating a subscriber identity module 500 embedded in the mobile communication terminal device 200 and information stored therein according to another exemplary embodiment.

Referring to FIGS. 2 and 3, the mobile communication terminal device 200 may be configured to include a subscriber identity module 500 including at least one or more profiles 511, 521, 522, and 531, a network authentication unit 210 ("network authenticator") configured to perform an authentication procedure on a communication network based on a provisioning profile 511 among the at least one or more profiles 511, 521, 522, and 531 and receive authentication completion information from the operator server 100 of the communication network, and a network access unit 220 ("network communicator") configured to access the communication network based on the authentication completion information and receive a service from the operator server 100 based on an operational profile 521 or 522 corresponding to the operator of the communication network among the at least one or more profiles 511, 521, 522, and 531.

The mobile communication terminal device 200 may perform user authentication with and access to the mobile communication network using profiles 511, 521, 522, and 531 of an eUICC 500 and also use the eUICC 500 as a storage space for user information (for example, a short message service, a multimedia message service, phonebook, etc.).

The profile may be classified into a provisioning file 511, an operational profile 521 or 522, a user profile 531, and so on. The provisioning profile 511 denotes a file that provides information necessary for authentication of the mobile communication network in order to support MNO activation when the eUICC 500 is not activated with the mobile communication network operator. In this case, the mobile communication network may be a network of any unspecified MNO or a network of a predetermined MNO. The eUICC 500 may include one or more provisioning profiles 511. Alternatively, there may be an eUICC 500 that does not include the provisioning profile 511. The terminal device 200 may perform an authentication procedure for a specific mobile communication network operator using authentication information stored in the provisioning profile 511 to receive service activation and receive authentication completion information for the service activation.

The operational profile 521 or 522 denotes a file that provides MNO network access information in order to access the MNO network to receive a service after the eUICC 500 is activated with the MNO. The eUICC 500 may include one or more operational profiles 521 and 522. If a provisioning profile 511 is not in the eUICC, the operational profile 521 or 522 may serve as the provisioning profile 511. The terminal device 200 may access a specific mobile communication network operator using access information stored in the operational profile 521 or 522 to receive a service of the operator.

There are a plurality of provisioning profiles 511, operational profiles 521 and 522, and user profiles 531 in the eUICC 500, and the terminal may select a specific profile from among the profiles according to the purpose.

The mobile communication terminal device 200 may be configured to further include a profile selection unit 230 ("selector") configured to select the provisioning profile 511 and the operational profile 521 or 522 based on an elementary file 541 including attribute information related to the at least one or more profiles 511, 521, 522, and 531.

The profile selection unit 230 may select the profile with reference to the profile attribute information in the elementary file 541 stored in the subscriber identity module 500. The elementary file 541 may include an application identifier 542 corresponding to the profile and also any other information defining the profile. The other information may be divided in units of objects and defined as a tag, a length, a value, or the like in order to determine a specification for mobile communication.

A function of each of the objects constituting the attribute information and a structure of the elementary file 541 will be described below.

Figure 4:
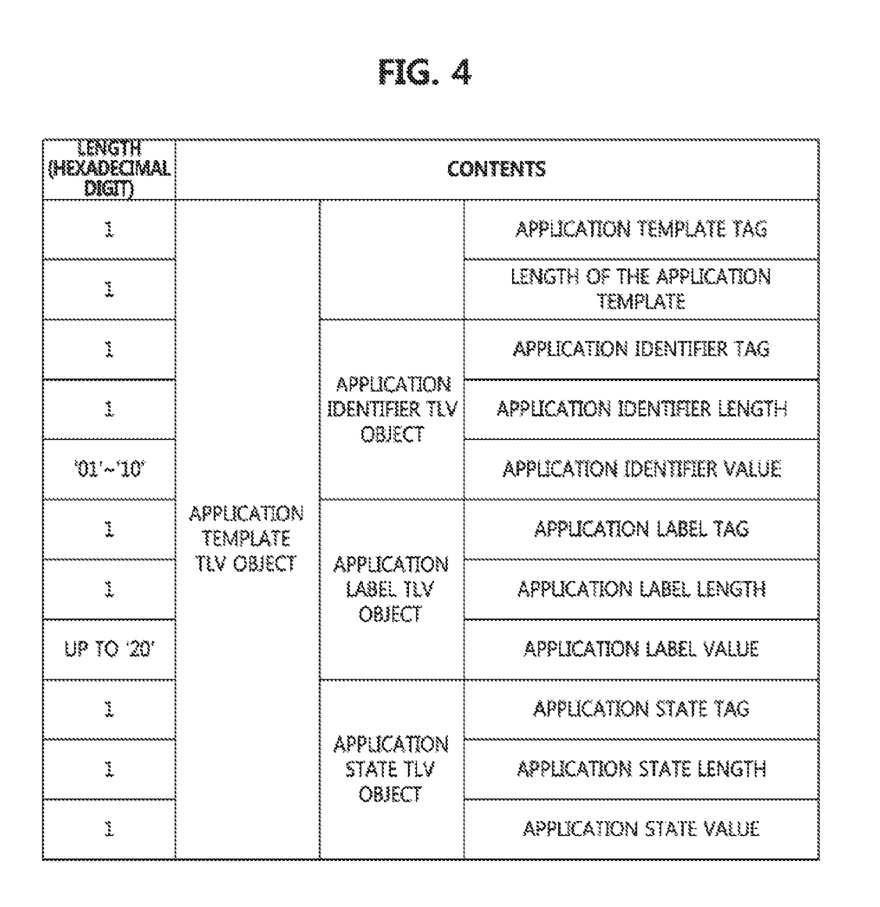
FIG. 4 is a conceptual view illustrating an application tag, length, and value (TLV) object among profile attribute information according to an exemplary embodiment.
Figure 5:
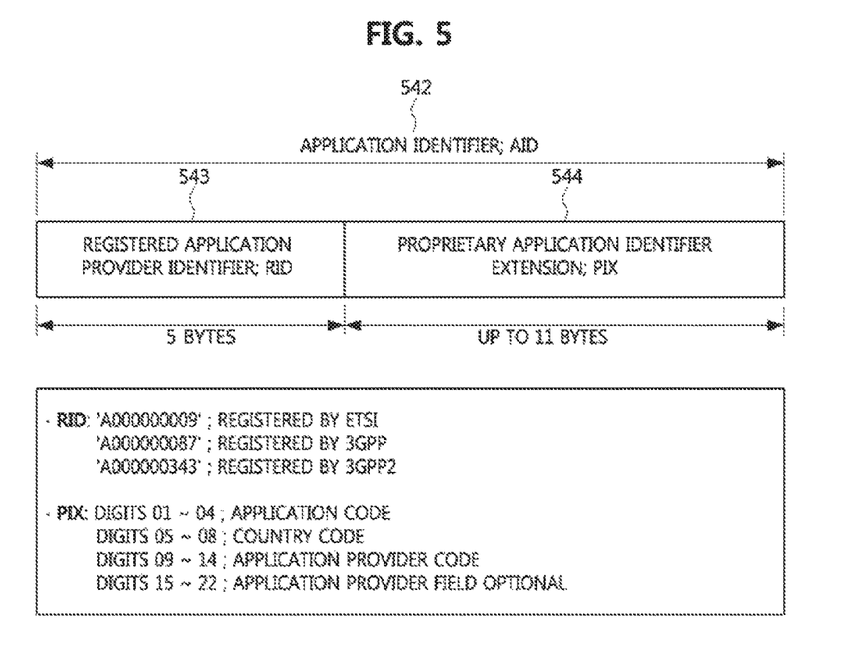
FIG. 5 is a block diagram illustrating an application identifier and its configuration information according to an exemplary embodiment.

FIG. 4 is a conceptual view illustrating an application tag, length, and value (TLV) object among profile attribute information according to an exemplary embodiment, and FIG. 5 is a block diagram illustrating an application identifier 542 and its configuration information. In addition, FIG. 6 is an exemplary view showing an example of a value of the application identifier 542 for each profile.

Figure 6:
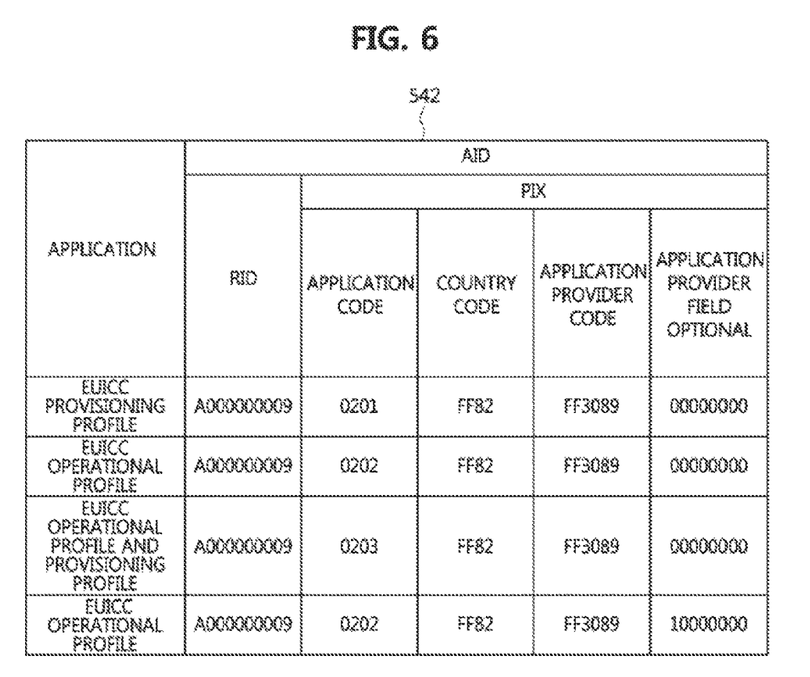
FIG. 6 is an exemplary view showing an example of a value of an application identifier for each profile according to an exemplary embodiment.

Referring to FIGS. 4 to 6, the attribute information may include an application identifier 542 that may be used to identify at least one profile 511, 521, 522, or 531, and the application identifier 542 may be composed of a registered application provider identifier (RID) 543 and a proprietary application identifier extension (PIX) 544.

In addition, the proprietary application identifier extension (PIX) 544 may include at least one of an application code, a country code, an application provider code, and an application provider field option.

Further referring to FIG. 3, which has been referred, the provisioning file 511 and the operational profiles 521 and 522 may be configured in the form of one or more application dedicated files (ADFs), as shown in FIG. 3. The ADF may store contents of a profile and information that may match an application identifier (AID) 542 among the attribute information stored in the elementary file 541.

In FIG. 3, reference number 511 may indicate a provisioning profile composed of one Application Dedicated File for the Universal Subscriber Identity Module (ADFUSIM) for accessing a WCDMA or LTE network, reference number 521 may indicate an MNO#1 operational profile composed of an ADFUSIM for accessing a WCDMA or LTE network and an Application Dedicated File for the International Mobile Subscriber Identity (ADFISIM) for accessing an IP multimedia subsystem (IMS) network, and reference number 522 may indicate an MNO#2 operational profile composed of an ADFUSIM for accessing a WCDMA or LTE network. FIG. 3 is merely one exemplary embodiment, and the number of profiles and the type of the network in FIG. 3 are only one example of many possible configurations.

An initial eUICC 500 may include an ADF for the provisioning profile 511 and an ADF for the operational profile 521 or 522 that serves as the provisioning profile 511. An ADF for one or more MNO operational profiles 521 and 522 may be added by accessing a mobile communication network through the provisioning profile 511 or the operational profile 521 or 522 serving as the provisioning profile 511, which is included in the initial eUICC. In addition, an ADF for a new provisioning profile 511 may be added.

The eUICC 500 may provide an application identifier (AID) 542 for selecting a profile to the terminal device 200 and include information thereof in the an elementary file 541. Here, it should be noted that the subscriber identity module 500 may selectively include one or more of the elementary provisioning profile 511, an MNO#1, operational profile 521, and an MNO#2 operational profile 522, but need not necessarily include all of the profiles. That is, the elementary file (EFDIR, Elementary File Directory) 541 of FIG. 3 may include one or more of AID #1 to AID #4, and thus one or more of the ADF files that are indicated by the AIDs.

Referring to FIG. 4, the elementary file 541 may be a means for providing the application identifier 542, which may include one or more application template tag, length, and value (TLV) objects. The application template TLV object may include application identifier information, application label information, and application state information.

An application identifier TLV object, an application label TLV object, and an application state TLV object of FIG. 4 reflect objects of the application identifier information, the application label information, and the application state information, respectively.

The application identifier TLV object may include the application identifier information. The application identifier value 542 may be composed of a registered application provider identifier (RID) 543 and a proprietary application identifier extension (PIX) 544 and may be up to 16 bytes in length. For example, the registered application provider identifier 543 may have a hexadecimal value of 'A000000009' in ETSI, a hexadecimal value of 'A000000087' in 3GPP, and a hexadecimal value of 'A000000343' in 3GPP2.

The proprietary application identifier extension (PIX) 544 is a part of the application identifier value 542 that includes proprietary information, which may include at least one of an application code, a country code, an application provider code, and an application provider field option.

The application code of the proprietary application identifier extension (PIX) 544 may include classification information that may classify types of the at least one or more profiles 511, 521, 522, and 531, and the types of the at least one or more profiles may include a provisioning profile 511 type, an operational profile 521 or 522 type, and an operational profile 521 or 522 type containing data of the provisioning profile 511.

The application code of the proprietary application identifier extension (PIX) 544 may include profile type information, that is, information indicating a provisioning profile 511 or any one of operational profiles 521 and 522. In addition, the application code may include information indicating a case in which the operational profile 521 or 522 is also used as the provisioning profile 511. In addition, the application code may define the profile type information and other information together. For example, any application code may define that the profile type is the provisioning profile 511 and a network access application (NAA) is a USIM.

The country code and the application provider code may include a country code and a provider (or operator) code of a provider of a corresponding profile. The terminal may recognize ADFs that are composed of the same profile type, country code, and application provider code as one profile. However, an ADF being the operational profile 521 or 522 provided as the provisioning profile 511 may be considered as the operational profile 521 or 522 although the application code value may be different from an application code value of the ADF provided as the operational profile 521 or 522.

The application provider field option may include profile type information, that is, information indicating a provisioning profile 511 or any one of operational profiles 521 and 522. In addition, the application code may include information indicating a case in which the operational profile 521 or 522 is also used as the provisioning profile 511. In addition, the application provider field option may define the profile type information and other information together.

An example in which the application identifier value 542 is defined will be described with reference to FIG. 6. Accordingly, when '0201' is allocated by ETSI as an application code for the eUICC provisioning profile 511, the country code is assumed as 'FF82,' and the provider code is assumed as 'FF3089,' the application identifier value 542 may be defined in the first row of FIG. 6.

When '0202' is allocated by ETSI as an application code for the eUICC operational profile 521 or 522, the country code is assumed as 'FF82,' and the provider code is assumed as 'FF3089,' the application identifier value 542 may be defined in the second row.

When '0203' is allocated by ETSI as an application code for the eUICC operational profile 521 or 522 that is used as the provisioning profile 511, the country code is assumed as 'FF82,' and the provider code is assumed as 'FF3089,' the application identifier value 542 may be defined in the third row.

When '0202' is allocated by ETSI as an application code for the eUICC operational profile 521 or 522, the country code is assumed as 'FF82,' the provider code is assumed as 'FF3089,' and '1xxxxxxx' ('x' is any value) is allocated in the application provider field option as information for a case in which the eUICC operational profile 521 or 522 is used as the provisioning profile, the application identifier value 542 may be defined in the fourth row.

Figure 7:
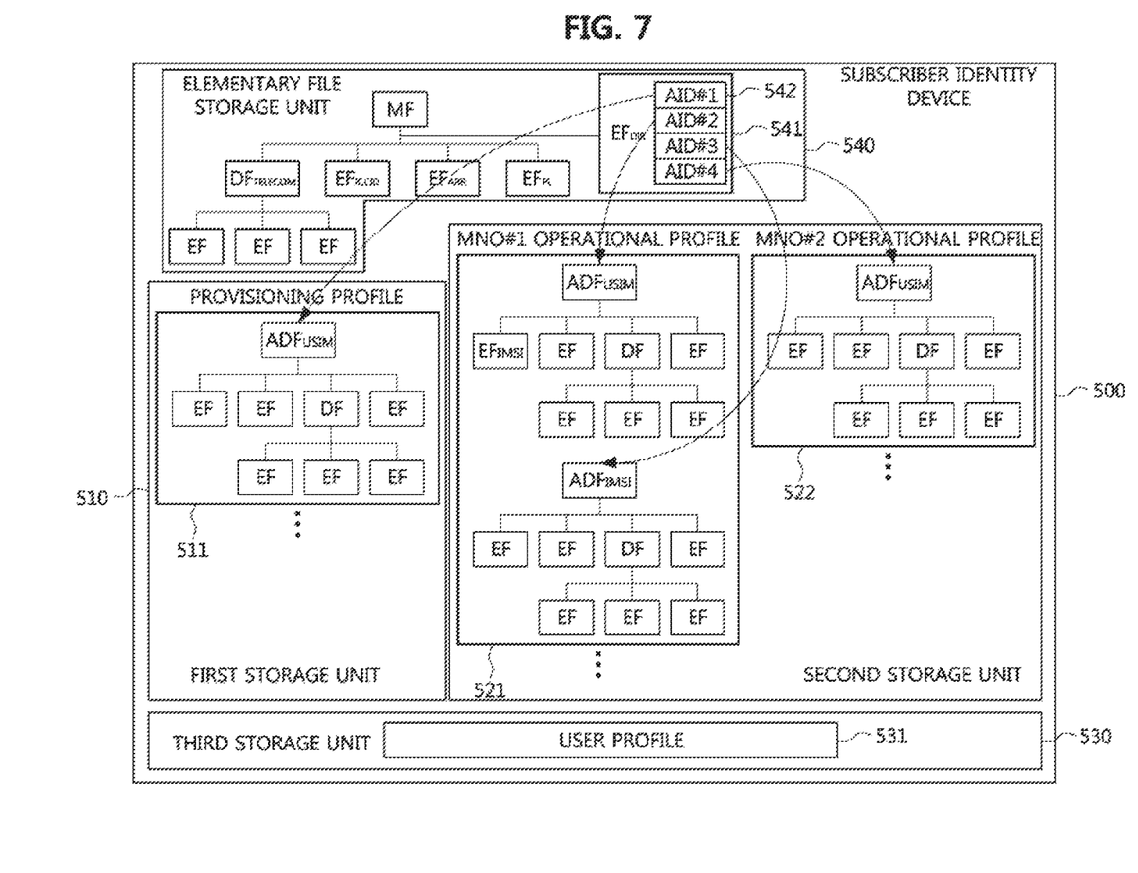
FIG. 7 is a block diagram illustrating a subscriber identity device and its elements according to an exemplary embodiment.

FIG. 7 is a block diagram illustrating a subscriber identity device 500 and its elements according to an exemplary embodiment.

Referring to FIG. 7, the subscriber identity device 500 embedded in the mobile communication terminal device 200 that accesses a communication network using at least one or more profiles 511, 521, 522, and 531 may be configured to include a first storage unit 510 configured to store at least one provisioning profile 511 having authentication information regarding a communication network, a second storage unit 520 configured to store at least one operational profile 521 or 522 having service access information used to receive a service of the communication network, and an elementary file storage unit 540 configured to store an elementary file 541 having attribute information related to the at least one profile used to select at least one profile.

The subscriber identity device 500 may be a subscriber identity module 500 in which a UICC is embedded. The first storage unit 510 that stores the provisioning profile 511, the second storage unit 520 that stores the operational profile 521 or 522, and the elementary file storage unit 540 that stores the elementary file 541 are logical division units, which may be stored in the same place or different places. The provisioning profile 511, the operational profile 521 or 522, and the elementary file 541 has been described above, and thus will not be repeatedly described.

The subscriber identity device 500 may be configured to further include a third storage unit 530 that stores at least one user profile 531 having user information of the mobile communication terminal device 200.

The subscriber identity device 500 may be used as a storage space of the user information (e.g., a short message service, a multimedia message service, a phonebook, etc.). The third storage unit may also be a logical division unit, and thus may be actually stored in the same or different place.

The subscriber identity device 500 may select the provisioning profile and the operational profile based on the elementary file which includes the attribute information related to at least one or more profiles, and the attribute information may include application identification information, application label information, and application state information for any profile among the at least one or more profiles 511, 521, 522, and 531.

Continuing to refer back to FIG. 4, which has been described above, the elementary file 541 may be a means for providing the application identifier 542, which may include one or more application template tag, length, and value (TLV) objects. The application template TLV object may include application identifier information, application label information, and application state information.

An application identifier TLV object, an application label TLV object, and an application state TLV object of FIG. 4 reflect objects of the application identifier information, the application label information, and the application state information, respectively. The application identifier information has been described above and thus will not be repeatedly described.

Figure 8:
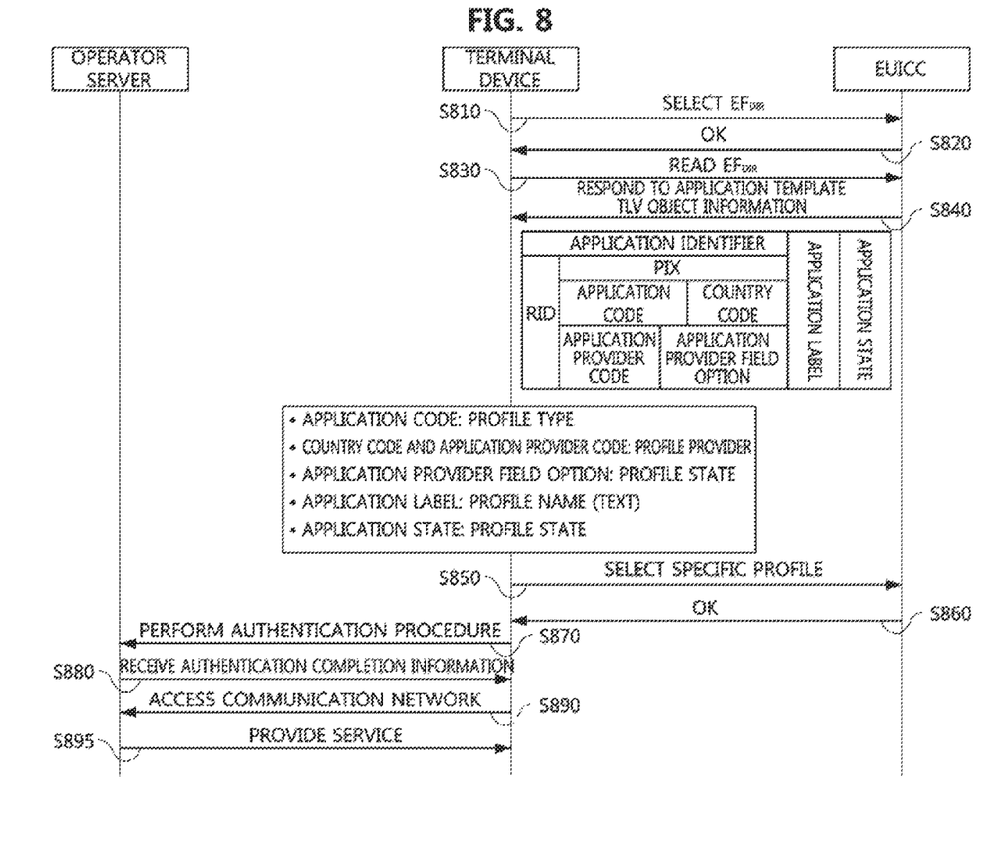
FIG. 8 is a flowchart illustrating a method of selecting a profile of a terminal device having a subscriber identity device embedded therein according to an exemplary embodiment.

FIG. 8 is a flowchart illustrating a method of selecting a profile of a terminal device 200 having a subscriber identity device 500 embedded therein according to an exemplary embodiment.

Referring to FIG. 8, a network access method of the mobile communication terminal device 200, which is a method of accessing a communication network using at least one or more profiles 511, 521, 522, and 531 included in the subscriber identity module 500, may be configured to include performing an authentication procedure on the communication network based on a provisioning profile 511 among the at least one or more profiles 511, 521, 522, and 531 (S870), receiving authentication completion information from an operator server 100 of the communication network (S880), and accessing the communication network based on the authentication completion information (S890) and receiving a service from the operator server 100 based on an operational profile 521 or 522 corresponding to the operator of the communication network among the at least one or more profiles 511, 521, 522, and 531 (S895).

The mobile communication terminal device 200 may perform user authentication with and access to the mobile communication network using profiles 511, 521, 522, and 531 of an eUICC 500 and also use the eUICC 500 as a storage space for user information (for example, a short message service, a multimedia message service, phonebook, etc.).

The profile may be classified into a provisioning file 511, an operational profile 521 or 522, a user profile 531, and so on. The provisioning profile 511 denotes a file that provides information necessary for authentication of the mobile communication network in order to support MNO activation when the eUICC 500 is not activated with the mobile communication network operator. In this case, the mobile communication network may be a network of any unspecified MNO or a network of a predetermined MNO. The eUICC 500 may include one or more provisioning profiles 511. Alternatively, there may be an eUICC that does not include the provisioning profile 511. The terminal device 200 may perform an authentication procedure for a specific mobile communication network operator using authentication information stored in the provisioning profile 511 (S870) to receive service activation and receive authentication completion information for the service activation (S880).

The operational profile 521 or 522 denotes a file that provides MNO network access information in order to access the MNO network to receive a service after the eUICC 500 is activated with the MNO. The eUICC 500 may include one or more operational profiles 521 and 522. If a provisioning profile 511 is not in the eUICC 500, the operational profile 521 or 522 may serve as the provisioning profile 511. The terminal device 200 may access a specific mobile communication network operator using access information stored in the operational profile 521 or 522 (S890) to receive a service of the operator (S895).

There are a plurality of provisioning profiles 511, operational profiles 521 and 522, and user profiles 531 in the eUICC 500, and the terminal device 200 may select a specific profile from among the profiles according to the operation (S850).

The network access method of the mobile communication terminal device 200 may be configured to further include, before receiving the authentication completion information (S880), selecting the provisioning profile 511 and the operational profile 521 or 522 based on an elementary file 541 including attribute information related to the at least one or more profiles 511, 521, 522, and 531 (S850).

The terminal device 200 may select an elementary file 541 (Elementary File Directory (EFDIR)) of the eUICC 500 (S810) and read a corresponding value to acquire application template TLV object information. In addition, a specific profile may be selected utilizing the application code included in the application template TLV object information to classify the profile type (the provisioning profile, the operational profile 521 or 522, and operational profile 521 or 522 simultaneously serving as the provisioning profile), utilizing the country code and the application provider code to classify the profile provider, utilizing the application provider field option to classify the operational profile 521 or 522 that may serve as the provisioning profile simultaneously, utilizing the application label as information related to profile text names, and utilizing the application state as the profile state information (S850).

Continuing to refer back to FIG. 2, which has been described above, the profile selection step (S850) may select the profile with reference to the profile attribute information in the elementary file 541 stored in the subscriber identity module 500. The elementary file 541 may include an application identifier 542 corresponding to the profile and also any other information defining the profile. The other information may be divided in units of objects and defined as a tag, a length, a value, or the like in order to determine a specification for mobile communication. A function of each object that constitutes the attribute information and a structure of the elementary file 541 have been described above.

The attribute information may include the application identifier 542 which may identify the at least one or more profiles 511, 521, 522 and 531, the application identifier 542 may be composed of a registered application provider identifier 543 and a proprietary application identifier extension 544, and the proprietary application identifier extension 544 may include at least one of an application code, a country code, an application provider code, and an application provider field option.

Continuing to refer back to FIG. 3, which has been described above, the provisioning profile 511 and the operational profile 521 or 522 stored in the eUICC 500 may be configured in the form of one or more application dedicated files (ADFs), as shown in FIG. 3. The ADF may store contents of a profile and information that may match an application identifier 542 among the attribute information stored in the elementary file 541. Various exemplary embodiments and detailed description of a configuration of the elementary file 541 and the application identifier 542 may be the same as described above.

The application code may include classification information that may classify types of the at least one or more profiles 511, 521, 522, and 531, and the types of the at least one or more profiles may include a provisioning profile 511 type, an operational profile 521 or 522 type, and an operational profile 521 or 522 type containing data of the provisioning profile 511.

The application code of the proprietary application identifier extension (PIX) 544 may include profile type information, that is, information indicating any one of a provisioning profile 511 and an operational profile 521 or 522. In addition, the application code may include information indicating a case in which the operational profile 521 or 522 is also used as the provisioning profile 511. In addition, the application code may define the profile type information and other information together. For example, any application code may define that the profile type is the provisioning profile 511 and a network access application (NAA) is a USIM.

The country code and the application provider code may include a country code and a provider (or operator) code of a provider of a corresponding profile. The terminal may recognize ADFs that are composed of the same profile type, country code, and application provider code as one profile. However, an ADF being the operational profile 521 or 522 provided as the provisioning profile 511 may be considered as the operational profile 521 or 522 although the application code value may be different from an application code value of the ADF provided as the operational profile 521 or 522.

The application provider field option may include profile type information, that is, information indicating a provisioning profile 511 or any one of operational profiles 521 and 522. In addition, the application code may include information indicating a case in which the operational profile 521 or 522 is also used as the provisioning profile 511. In addition, the application provider field option may define the profile type information and other information together.

Although several aspects of the exemplary embodiments have been discussed herein with regard to a specific device, it will be obviously understood that the aspects may be utilized in a corresponding method. Here, steps of the method correspond to components of the device. According to certain implementations, exemplary embodiments may be implemented in hardware or software. Exemplary embodiments may be performed as a computer program product including program codes that execute any one of the above methods.

While the exemplary embodiments and their advantages have been described in detail, it should be understood that various changes, substitutions, and alterations may be made herein without departing from the scope of the invention.

The invention claimed is:

1. An embedded universal integrated circuit card (eUICC) built into and installed in a mobile terminal communicating with a mobile communication network, the eUICC comprising:
   a storage configured to store:
      a provisioning profile and an operational profile having service access information used to receive a service of the mobile communication network, the operational profile comprising at least one application dedicated file including information matching with at least one application identifier, wherein the at least one application dedicated file is used to access the mobile communication network; and
   a processor configured to initially connect to the mobile communication network with the provisioning profile and receive a service from an operator server based on the operational profile corresponding to an operator of the mobile communication network,
   wherein the storage is further configured to store at least one attribute information related to one or more profiles, the attribute information including information to classify the one or more profiles as one from among a provisioning profile and an operational profile, and
   wherein the attribute information related to the one or more profiles includes at least one of a profile identifier and profile attribute information.

2. The eUICC of claim 1, wherein the storage is further configured to store a master file.

3. The eUICC of claim 1, wherein the mobile terminal is a machine-to-machine (M2M) terminal or a machine type communication (MTC) terminal.

4. The eUICC of claim 1, wherein the attribute information related to the one or more profiles is configured in a form of an application tag, length, and value (TLV) object.

5. The eUICC of claim 1, wherein the provisioning profile provides information necessary for authentication of the mobile communication network when the eUICC is not activated with a mobile communication network operator.

6. The eUICC of claim 1, wherein the attribute information includes an application identifier comprising a registered application provider identifier (RID) and a proprietary application identifier extension (PIX), and
   the proprietary application identifier extension (PIX) comprises at least one from among an application code, a country code, an application provider code, and an application provider field option.

7. A method of accessing a communication network using at least one or more profiles included in an embedded universal integrated circuit card (eUICC) built into and installed in a mobile terminal communicating with a mobile communication network, the method comprising:

storing a provisioning profile and an operational profile in a storage within the eUICC, the operational profile comprising at least one application dedicated file including information matching with at least one application identifier, wherein the at least one application dedicated file is used to access the mobile communication network;

accessing the mobile communication network with the provisioning profile initially using the provisioning profile when the eUICC is not activated with a mobile communication network operator;

receiving a service from an operator server based on the operational profile corresponding to an operator of the communication network, the operational profile having service access information used to receive a service of the mobile communication network; and storing, within the eUICC, at least one attribute information related to one or more profiles, the attribute information including information to classify the one or more profiles as one from among a provisioning profile and an operational profile, wherein the attribute information related to the one or more profiles includes at least one of a profile identifier and profile attribute information.

8. The method of claim 7, wherein the storage further stores a master file.

9. The method of claim 7, wherein the mobile terminal is a machine-to-machine (M2M) terminal or a machine type communication (MTC) terminal.

10. The method of claim 7, wherein the attribute information related to the one or more profiles is configured in a form of an application tag, length, and value (TLV) object.

11. The method of claim 7, wherein the provisioning profile provides information necessary for authentication of the mobile communication network when the eUICC is not activated with a mobile communication network operator.

12. The method of claim 7, wherein the attribute information includes an application identifier comprising a registered application provider identifier (RID) and a proprietary application identifier extension (PIX), and the proprietary application identifier extension (PIX) comprises at least one from among an application code, a country code, an application provider code, and an application provider field option.

* * * * *